United States Patent [19]

Philipson

[11] 4,079,160

[45] Mar. 14, 1978

[54] ABRASION-RESISTANT OPTICAL ELEMENT

[76] Inventor: Joseph Philipson, 1485 Old House Rd., Pasadena, Calif. 91107

[21] Appl. No.: 765,941

[22] Filed: Feb. 7, 1977

[51] Int. Cl.² .......................... B32B 7/02; G02C 7/02; B32B 27/40

[52] U.S. Cl. .................................. 428/217; 351/159; 351/166; 2/234; 351/41; 351/44; 428/412; 428/413; 428/425; 428/447; 428/501; 428/515; 428/516; 428/523; 428/912

[58] Field of Search ..................... 2/434, 435; 350/321; 351/41, 44, 159, 166; 428/68, 76, 412, 413, 425, 446, 447, 480, 483, 501, 515, 522, 523, 516

[56] References Cited

U.S. PATENT DOCUMENTS

| | | | |
|---|---|---|---|
| 2,851,388 | 9/1958 | Punton et al. | 428/190 X |
| 3,637,416 | 1/1972 | Misch et al. | 428/412 |
| 3,935,367 | 1/1976 | Merrill et al. | 351/166 X |
| 3,971,872 | 7/1976 | LeBoeuf | 351/166 X |
| 4,018,941 | 4/1977 | Tucker | 428/42 X |

*Primary Examiner*—Thomas J. Herbert, Jr.
*Assistant Examiner*—R. Eugene Varndell, Jr.
*Attorney, Agent, or Firm*—Tilton, Fallon, Lungmus & Chestnut

[57] ABSTRACT

A coated abrasion-resistant optical element, such as an eyeglass lens, formed of a typical rigid polymeric substrate of relatively low scratch resistance coated on at least one surface with a relatively soft, resilient, and tough transparent polymeric material. The essential characteristics of the coating material resulting in an abrasion-resistant protective film for the optical element are disclosed.

20 Claims, 2 Drawing Figures

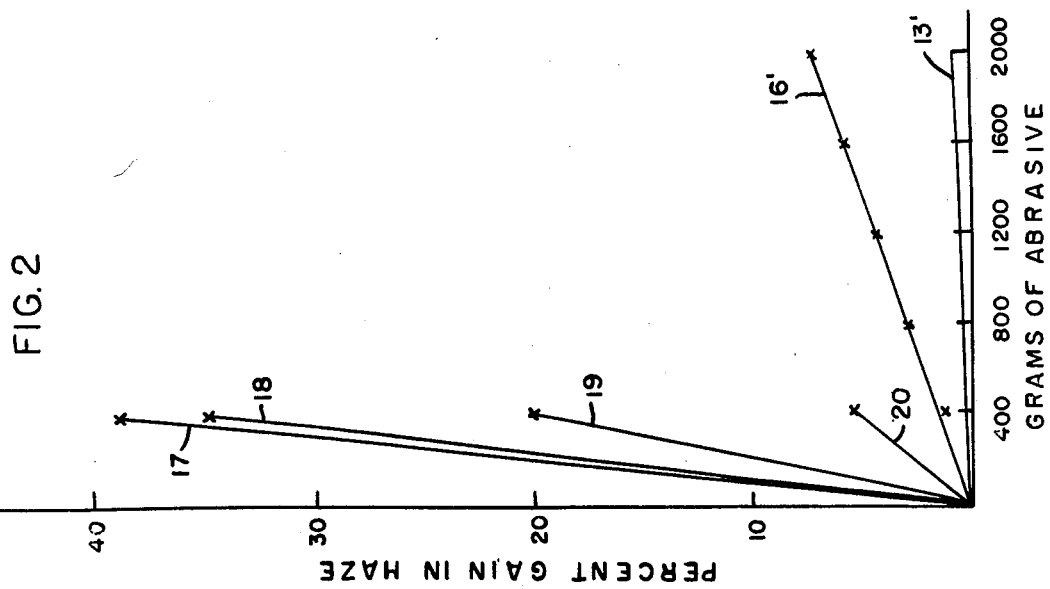
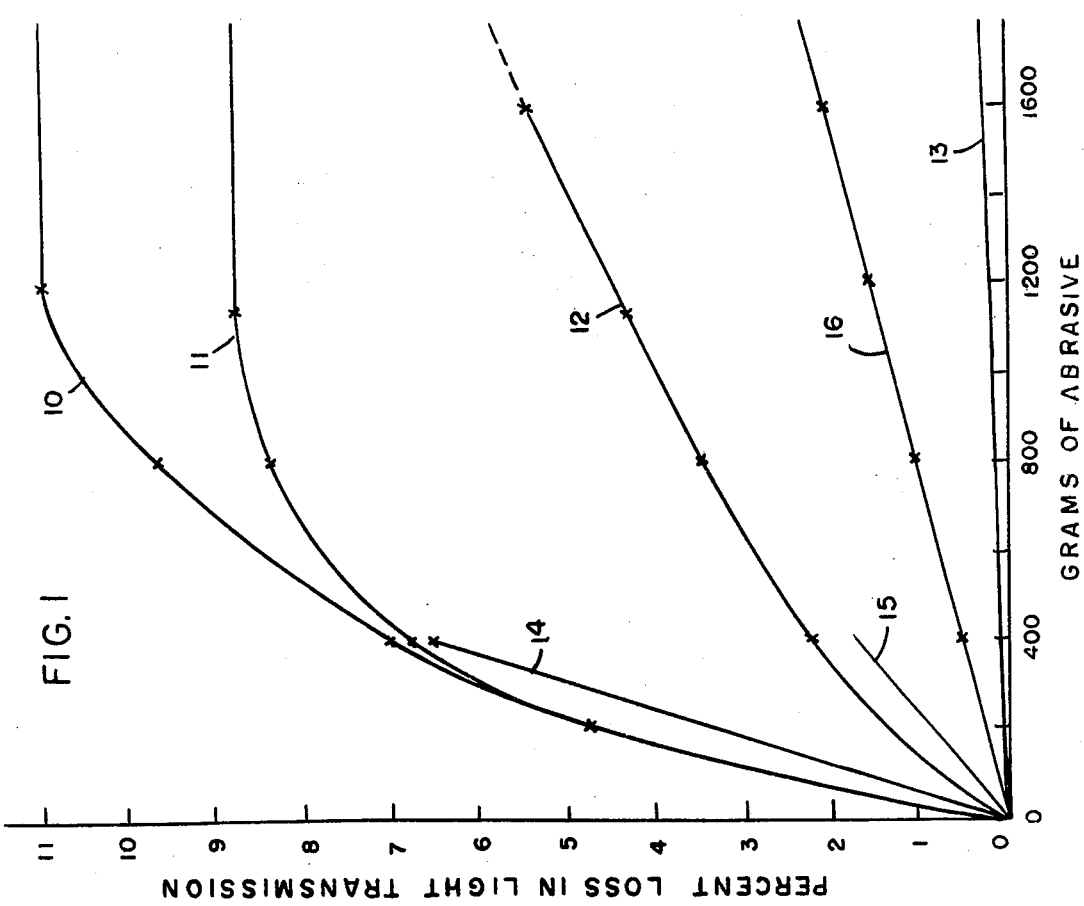

ABRASION-RESISTANT OPTICAL ELEMENT

BACKGROUND

While plastic materials have been used for a number of years in the manufacture of various types of optical elements, including eyeglass lenses, telescope and camera lenses, and the optical components of windows, canopies, reflectors, and the like, and although such plastics are clearly superior to glass in terms of strength-to-weight ratios and their resistance against fracture, they also have the well-recognized disadvantage of being less abrasion resistant than glass. Accordingly, considerable effort has been directed in recent years to improving the abrasion resistance of optical elements formed from polycarbonates and other plastic materials.

Various plastic materials have been used in the past in fabricating optical elements, such materials including polycarbonates, polyacrylics, cellulose acetate, polystyrene, polysulfones, cellulose acetate butyrate, polyesters, and selected copolymers thereof. At present, most opthalmic eyeglass lenses are formed of a particular polycarbonate(poly(diethylene glycol bis allyl carbonate)) marketed under the designation "CR-39" by PPG Industries, Pittsburgh, Pennsylvania, because, among other things, that material has greater abrasion resistance than other plastic materials. In comparison with glass, however, CR-39 is still far less resistant to abrasion and, as a result, considerable effort has been expended in the optical field to develop some treatment for CR-39, and for other rigid transparent plastics, to make the surfaces of such materials harder, with abrasion-resistant properties more akin to those of glass. The following U.S. patents are illustrative of such efforts: U.S. Pat. Nos. 3,645,779 (vacuum-depositing a glass coating upon a transparent polymeric substrate to form an optical element having increased abrasion resistance); 3,019,131 (coating plastic optical elements with polymerizable derivatives of polyalkyleneglycol to increase mar resistance); 3,811,753 (applying vitreous silicate coatings to plastic optical elements to improve abrasion resistance); 2,904,450 (coating plastic optical elements with germanium and silicon oxide to produce abrasion resistance similar to glass); 2,851,388 (cladding a plastic layer with one or more glass or hard plastic layers to improve abrasion resistance); 2,361,589 (coating a plastic opthalmic lens with a layer of a harder material such as glass to increase abrasion resistance). While such techniques for forming a glass or glass-like coating on plastic optical elements have been encouraging, the technical difficulties and operating costs are sufficiently great that no substantial commercial success has yet been achieved.

SUMMARY

An important aspect of this invention lies in the discovery that increased abrasion resistance for plastic optical elements may be achieved by coating such elements with a relatively soft resilient material, one which is considerably softer (rather than harder) than the plastic substrate to which it is applied. It has been found that such soft deformable coatings not only resist abrasion but, when subjected to forces of sufficient magnitude to produce small scratches, tend to be self-healing. The result is an optical element which has all of the weight and strength advantages of a conventional plastic lens, such as one formed from CR-39, while at the same time having substantially improved resistance to abrasion.

Any of a variety of soft transparent polymeric materials may be used for the protective coating although particularly effective results have been achieved with polyurethane coatings prepared from a cycloaliphatic diisocyanate and selected polyols. As essential characteristics, the polymeric coating material should have a durometer within the range of 10 Shore A to 95 Shore D and a flexural modulus of less than $0.2 \times 10^5$ psi as measured by ASTM Standard D790. The degree of transparency may vary depending upon the particular use intended for the optical element; however, the coated element should have a light transmission value of at least 70 percent, and a haze value no greater than 5 percent, when tested in accordance with ASTM Standard D1003. Such a coating, when further tested at a thickness of about ½ mil on a flat transparent test sample of CR-39, produces a loss of light transmission no greater than 2.3 percent, and an increase in haze no greater than 8.1 percent, when tested in accordance with ASTM Standard D673, modified to increase the amount of grit to 2 kilograms, and ASTM Standard D1003, and produces no permanent score visible to the naked eye following engagement by a moving stylus at a loading of up to 20 grams in accordance with ASTM Standard F32.

The thickness of the coating falls within the range of 0.1 to 20 mils, the preferred range being 0.2 to 5 mils. For an eyeglass lens, the optimum coating thickness is believed to be about 1 mil.

Other advantages and objects of the invention will become apparent from the detailed description and drawings.

DRAWINGS

FIG. 1 is a graph showing changes in light transmission of optical elements formed of different materials compared with an element coated in accordance with this invention, all such elements being subjected to a standard abrasion test.

FIG. 2 is a graph depicting changes in haze when optical elements formed of different materials, including an element coated in accordance with this invention, are subjected to a standard abrasion test.

DETAILED DESCRIPTION

Since this invention is concerned with a coating which improves the abrasion resistance of transparent plastics known to be useful in the fabrication of optical elements, thereby overcoming a well-known disadvantage in the utilization of such materials for that purpose, it follows that any relatively rigid transparent polymeric material having suitable optical properties may be used as the substrate for the protective coating. Most of the plastic opthalmic lenses currently available are made of polycarbonates because of the relatively good optical properties, higher dimensional stability, and somewhat greater hardness of those materials. Of the carbonates, CR-39 (diethylene glycol bis allyl carbonate polymer) is generally considered superior and will therefore be mentioned frequently here in setting forth the best mode presently contemplated for carrying out this invention. It is to be understood, however, that other rigid polymeric materials may be used as the substrate for the protective coating, such materials all being known for use in the fabrication of optical elements and including, in addition to polycarbonates, acrylic polymers, polystyrene, polysulfones, cellulose acetate, cellulose acetate butyrate, polyurethanes, poly(4-methyl pentene-1), epoxies, polyesters, and various copolymers of such materials, such as copolymers of styrene and acrylic-based materials such as methylmethacrylate or acrylonitrile. All such polymeric substrate materials are relatively rigid, having a durometer substantially above 95 Shore D and a flexural modulus substantially more than $0.2 \times 10^5$ psi as measured by ASTM Standard 790. Since the substrate constitutes an optical element, it is believed obvious that the substrate must not only be transparent but also must have at least a pair of smooth optical surfaces. The protective coating of this invention is applied to one, and possibly to both, of such surfaces to produce an abrasion-resistant optical element.

Like the substrate, the coating is also a synthetic transparent polymer; however, unlike the substrate, the coating is relatively soft and resilient, having a durometer within the range of 10 Shore A to 95 Shore D and a flexural modulus of less than $0.2 \times 10^5$ psi as measured by ASTM Standard D790. When tested in accordance with ASTM Standard D673 at a thickness of about $\frac{1}{2}$ mil on a flat transparent test sample of diethylene glycol bis allyl carbonate, the loss of light transmission of the coating should be no greater than 2.3 percent and the increase in haze should be no greater than 8.1 percent.

Soft polymeric coating materials having such properties include polyurethanes, polybutadienes, and butadiene-styrene copolymers. In addition, coating compositions meeting such requirements may be formulated from silicones, polysulfides, epoxies, acrylics, and various copolymers of such materials such as, for example, copolymers of butadiene and acrylic acid, and copolymers of various acrylic esters such as methylacrylate and lauryl methacrylate. Particularly effective results have been obtained with polyurethanes and such materials are therefore disclosed in detail as comprising the best mode presently known for practicing the invention. The polyurethane reaction products of a cycloaliphatic dissocyanate and a mixture of aliphatic diols and polyols with more than two hydroxy groups are especially effective.

The coating may be applied to the substrate by any convenient method. Dipping or spinning techniques have been found useful, the latter being particularly suitable for coating small articles such as eyeglass lenses. Ordinarily the coating material must be dissolved in a suitable solvent (such as chlorobenzene, aliphatic hydrocarbons such as normal hexane or heptane, cycloaliphatic hydrocarbons such as cyclohexane, aromatic hydrocarbons such as toluene, or esters such as ethyl acetate) and in some instances it may be desirable to add a small amount of cellulose acetate butyrate polymer, or some other suitable wetting agent, to improve the wetting characteristics of the coating material for the substrate. Whatever the technique employed, the final thickness of the coating on the optical surface to be protected should fall within the general range of 0.1 to 20.0 mils, the preferred range being 0.2 to 5 mils. Where the optical element is an eyeglass lens, a coating thickness of about 1 mil is believed particularly effective. Coatings substantially thinner than 0.1 mil do not afford adequate protection, whereas coatings substantially heavier than 20.0 mils fail to increase the protection afforded and the added weight from the coating may be undesirable.

The coating, like the substrate to which it is secured, must be transparent although that term is not intended to exclude the inclusion of tints or dyes which have a limited effect in reducing light transmission and, hence, in reducing transparency. Where the optical element is tinted, the tint may be incorporated within, or on the surface of, the substrate, or the coating, or both. To serve as an optical element, the final product (i.e., the coated substrate) should have a light transmission value of at least 70 percent when tested in accordance with ASTM D1003 and have a haze value no greater than 5 percent when tested in accordance with ASTM D1003.

Since diethylene glycol bis allyl carbonate (CR-39) is widely known and used in the manufacture of plastic eyeglass lenses, that material was selected as a substrate in conducting abrasion tests in accordance with ASTM Standards D673 and D1003. A soft transparent coating formed of a resilient polymer meeting all of the other requirements already specified, should produce a loss of light transmission no greater than 2.3 percent, and an increase in haze no greater than 8.1 percent, when tested in accordance with ASTM D673 and ASTM D1003 at a thickness of about $\frac{1}{2}$ mil on a flat transparent test sample of diethylene glycol bis allyl carbonate. As is well known, ASTM D673 is a standard method for testing the mar resistance of plastics by optically measuring the changes produced when measured amounts of abrasive (No. 80 carborundum or an equivalent abrasive) are allowed to fall and impact a test sample supported at a 45° angle. The test procedure utilized for establishing the characteristics of the soft coating for optical elements is the same as set forth in ASTM D673 except that, instead of measuring loss of gloss, both loss of light transmission and gain in haze were determined in accordance with ASTM D1003 because such determinations are believed particularly important in connection with transparent test samples.

Scratch testing in accordance with ASTM procedure F32 has established that optical elements coated with a soft polymeric coating in accordance with this invention do not reveal any permanent score visible to the naked eye following engagement by a moving 2 mil radius stylus at a loading of at least 20 grams. These coatings were tested at a thickness of about $\frac{1}{2}$ mil on a flat transparent test sample of diethylene glycol bis allyl carbonate. (In some instances, scratch testing procedures were also conducted with thinner coatings exceeding 0.1 mil to determine scratch resistance under even more severe conditions.) The word "permanent" is to be stressed here because some coatings were found to develop minute scratches which would almost immediately disappear, the interval for such self-healing in no case exceeding 10 minutes. The self-healing characteristics of the soft resilient coatings constitute an important additional aspect of this invention.

Of primary importance is the fact that such soft coatings are highly resistant to the formation of scratches in the first instance. FIG. 1 is a graph comparing the changes in light transmission when coated and uncoated samples are subjected to the abrasion test of ASTM D673. Line 10 shows that when a sample of methylmethacrylate is subjected to the abrasion test, the loss of light transmission as measured by ASTM D1003 is substantial, approximately 12 percent. A conventional thermoplastic polycarbonate marketed under the designation "Lexan" was somewhat better, as revealed by line 11. As expected, even better results were obtained with a sample of optical glass, the percentage loss in transmission being slightly more than 5.5 percent following impact by 1600 grams of abrasive (line 12). Line 13 represents the loss of light transmission (less than 0.5 percent) when the soft transparent polymeric coating on a substrate of CR-39 was treated even more severely than the glass, being subjected to contact by 2000 grams of abrasive grit under otherwise identical conditions. The sample of line 13, coated with a polyurethane having a durometer within the range of 10 Shore A to 95 Shore D and a flexural modulus of less than $0.2 \times 10^5$ psi, performed far better than glass. On the other hand, samples with a polyurethane coating (on a CR-39 substrate) substantially softer than 10 Shore A, or substantially harder than 95 Shore D, performed poorly as represented by lines 14 and 15, respectively. The sample of line 16 represents uncoated CR-39 for purposes of comparison.

The soft resilient coating represented by line 13 not only showed relatively low loss of light transmission following abrasion testing (FIG. 1), but also revealed only minimal gain in haze, as indicated by line 13' in FIG. 2. By comparison, an uncoated sample of cellulose acetate butyrate faired the worst (line 17) with uncoated thermoplastic polycarbonate not much better (line 18). No material performed as well as the soft-coated sample of line 13', although the thermosetting polycarbonate (CR-39) of line 16' was more resistant than most of the others, including an uncoated sample of methylmethacrylate (line 19) and a CR-39 substrate coated with polyurethane having a durometer substantially above 95 Shore D (line 20).

The invention is further revealed by the following illustrative examples:

EXAMPLE 1

Coating materials for producing soft resilient coatings on plastic optical elements were prepared by reacting an alicyclic diisocyanate with di- and tri-functional polyols, in the presence of a suitable catalyst and optionally a suitable solvent-diluent, in accordance with the following procedure:

A prepolymer is first prepared from all of the diisocyanate and diol to be used in the formulation. If desired, small amounts of triol may be used in the preparation of the prepolymer but the amount of triol permitted is strictly limited because of the tendency of the triols to cross link and form gel structures which increase the viscosity to the point that further processing becomes difficult. Depending upon the thickness of the coating desired and the viscosity of the diol selected, the prepolymer may be made either in bulk or in the presence of a solvent such as chlorobenzene. The use of a solvent makes the processing easier but limits the thickness of coating which can be applied in a single coat. Following preparation of the prepolymer, the final polymer is prepared by adding the remaining diol and/or polyol to complete the reaction.

To make the prepolymer, the aliphatic diol is placed in a dry reaction flask along with any triol or solvent that may be used in the prepolymer formulation. A dibutyl-tin-dilaurate catalyst (Catalyst T-12, M&T Chemicals, Inc., Rahway, New Jersey) is added, usually in the amount of 0.01 to 0.1 percent by weight based on the weight of diisocyanate. The contents of the reaction flask are heated to about 60° C. and the diisocyanate (Hylene W, E. I. duPont deNemours & Co., Inc., Wilmington, Delaware) is added dropwise from a dropping funnel. The temperature in the reaction flask is controlled by controlling the rate of addition of diisocyanate and the use of auxiliary heating or cooling. The reaction is exothermic with the diisocyanate being added at such a rate as to keep the temperature to a maximum of 60° C. After all of the diisocyanate has been added to the flask, the reaction is allowed to proceed by maintaining the flask temperature at 60° C. for at least 2 hours.

The final polymer is made by adding the remaining diol and/or polyol to the prepolymer, mixing throughly, degassing the mixture by vacuum treatment, filtering the mixture through a 0.2 micron filter to remove all foreign matter that might interfere with the optical quality of the final coating, and the applying the filtered mix by suitable means to the surface to be coated. The substrate surface should be dry (best accomplished by pre-drying the substrate in an oven) and all of the reactants should be pre-dried to a water content of 10 ppm or less. After the substrate has been coated, the coating must be protected from atmospheric moisture by immediately placing it in a heated, dry atmosphere, such as an oven. The coating is cured by heating to approximately 100° C. for 1 hour.

Aliphatic diols which may be used in forming the polymer include polyether polyols marketed by Dow Chemical Company, Midland, Michigan, under the designations Voranol 2103 (eq. wt. 148), Voranol 2120 (eq. wt. 982), Voranol 2140 (eq. wt. 1196); polytetramethylene ether glycols marketed by Quaker Oats Company, Chicago, Illinois, under the designation Polymeg 1000 (eq. wt. 496); polyoxypropylene derivatives of propylene glycol marketed by BASF Wyandotte Corporation, Wyandotte, Michigan, under the designations Pluracol 410 (eq. wt. 212), Pluracol 710 (eq. wt. 387), Pluracol 1010 (eq. wt. 524), Pluracol P-2010 (eq. wt. 1004). Aliphatic triols may be selected from polyether polyols marketed by Dow Chemical Company under the designations Voranol 2026 (eq. wt. 85.4), Voranol 2070 (eq. wt. 246); polyoxypropylene derivatives of trimethylol propane marketed by BASF Wyandotte Corporation under the designations Pluracol 440 (eq. wt. 145), Pluracol 740 (eq. wt. 235), Pluracol 1540 (eq. wt. 534), Pluracol 4040 (eq. wt. 1332), Pluracol 4542 (eq. wt. 1496). Other satisfactory polyols include quadrol marketed by BASF Wyandotte Corporation, glycerol, trimethylol propane, and sugars such as sorbitol.

If desired, the ultraviolet resistance of the coating may be improved by including an ultraviolet resistant reactant such as hydroxyethyl methacrylate (HEMA) in the formula. Other additives may also be incorporated such as, for example, a wetting agent (e.g. a 1 to 10 percent solution of cellulose acetate butyrate polymer in chlorobenzene or other suitable solvent).

EXAMPLE 2

A number of sample optical elements were prepared using substrate disks of diethylene glycol bis allyl carbonate having a thickness of 1 to 2 millimeters (substrate thickness is not critical in the tests in which such disks were later used), each substrate disk being coated with a polyurethane coating material prepared in accordance with Example 1 and applied by a dropper to the center of one of the optical surfaces of each disk while the disk was supported in stationary condition on a turntable. After an interval of about 5 seconds, each disk was then rotated rapidly (at about 2000 rpm) to distribute the liquid polymer uniformly over the exposed surface of the disk to achieve a coating thickness of approximately ½ mil. In some instances successive applications were required to achieve the desired coating thickness. The coating formulations for the 13 samples so prepared are set forth in Table I below:

TABLE I

| Component | Eq. Wt. | 1 | 2 | 3 | 4 | 5 | 6 | 7 | 8 | 9 | 10 | 11 | 12 | 13 |
|---|---|---|---|---|---|---|---|---|---|---|---|---|---|---|
| Diisocyanate | 132 | 3.15 | 4.20 | 4.725 | 4.725 | 1.575 | 4.725 | 5.25 | 5.25 | 5.25 | 5.25 | 5.25 | 6.3 | 5.25 |
| Diol | 387 |  | 1.0 |  |  |  |  |  |  |  |  |  |  |  |
|  | 527 |  |  | 1.0 | 0.5 | 0.5 | 0.5 |  |  |  |  |  |  |  |
|  | 1004 | 2.0 |  |  | 0.5 | 0.5 | 0.5 | 1.0 | 1.0 | 1.0 | 1.0 | 1.0 | 1.0 |  |
|  | 212 |  |  |  |  |  |  |  |  |  |  |  |  | 1.0 |
| Triol | 30 |  |  |  |  |  |  | 0.25 | 0.24 |  | 0.25 | 0.5 |  |  |
|  | 45 |  |  |  |  |  |  | 0.75 | 0.72 |  | 0.75 | 1.5 |  |  |
|  | 85.4 |  |  | 3.0 | 3.5 | 1.65 | 3.2 | 3.0 | 2.89 | 0.5 | 0.5 | 0.5 | 0.5 | 4.0 |
|  | 242 | 1.0 |  |  |  |  |  |  |  | 3.5 | 2.5 | 1.5 | 4.5 |  |
| HEMA | 130 |  |  |  |  | 0.1 | 0.3 |  | 0.25 |  |  |  |  |  |
| Ratio NCO:OH |  | 1.05 | 1.05 | 1.05 | 1.05 | 0.57 | 1.05 | 1.05 | 1.05 | 1.05 | 1.05 | 1.05 | 1.05 | 1.05 |

EXAMPLE 3

The coated samples of Example 2 were tested in accordance with ASTM D673 using No. 80 carborundum falling a distance of 1 meter in total quantities of 2 kilograms for each sample. Since the sample elements were transparent, the results of the tests were measured in terms of loss of light transmission and gain in haze (in accordance with ASTM Standard D1003). The following results were obtained, each sample being designated by the same number appearing in Example 2:

TABLE II

| | Sample Optical Element | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Loss in Transmission (%) |  |  | 0.9 | 4.1 | 2.0 | 4.0 | 5.6 | 2.2 | 0.2 | 0.2 | 0.1 | 0.3 | 2.2 |
| Gain in Haze (%) |  |  | 0.5 | 0 | 1.9 | 0.6 | 1.4 | 1.8 | 0 | 0.4 | 1.2 | 0 | 3.8 |
| Hardness of Coating Composition | <10A | 85D | 75D | 75A/35D | 60A/30D | 30A | 90A/40D |  | 45A | 60A | 85A | 45A | >95D |

Table II also sets forth the hardness of the coating compositions which were tested separately by the procedure set forth in ASTM 2240. The designations "A" and "D" refer to the Shore scales used; thus, 85D refers to a durometer of 85 on the Shore D scale, and 45A refers to a durometer of 45 on the Shore A scale. The coating material of sample 1 was too soft to be measured (i.e., well under 10 Shore A) and the coating material of sample 13 was too hard to be abrasive resistant, being well over 95 Shore D.

Sample 13 was atypical because, unlike the other samples, it was exposed to only 400 grams of grit. Continuation of the test, exposing sample 13 to 1600 grams of grit (or more), would obviously have resulted in much higher values for loss of transmission and gain in haze. Unlike the coating of sample 13, which was too hard to be acceptable, the coating of sample 1 was too soft and did not remain in place through the test to protect the substrate or to give any meaningful values for transmission loss or haze gain. The coatings of samples 2 through 12 were all acceptable with the coatings of samples 9 through 12 showing outstanding abrasion resistance. As a basis for comparison, an uncoated sample of the substrate (CR-39), subjected to the same treatment as samples 1 through 12, gave a light transmission loss value of 2.3 percent and a haze gain value of 8.1 percent.

EXAMPLE 4

Coated samples prepared in accordance with Example 2 were subjected to scratch testing following the procedure of ASTM F32. The stylus had a tip radius of 2 mils. Each sample was tested by exposing the coated surface to the moving stylus under different stylus loadings to determine the loading (in grams) at which a permanent scratch visible to the naked eye was observed. Table III below sets forth such loadings, as well as the next lighter loading of each test at which no permanent scratch was visible to the naked eye:

TABLE III

| | Sample Optical Element | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| No Scratch |  | 40 | 30 | 30 | 30 | 30 | 40 | 30 | 30 | 30 | 30 | 15 | 5 |
| Scratch |  | 50 | 40 | 40 | 40 | 40 | 50 | 40 | 40 | 40 | 40 | 30 | 10 |

The coating of sample 1 was too soft to give significant results by this test; the stylus penetrated completely through the coating to rupture or tear the coating and to expose the substrate to direct contact by the stylus. The hard coating of sample 13 scratched easily and is clearly unacceptable, as evidenced by the further fact that the uncoated substrate (CR-39) when subjected to the same test showed "no scratch" at 10 grams and "scratch" at 15 grams. Thus, the coated sample 13 showed less scratch resistance than an uncoated sample.

While in the foregoing I have disclosed embodiments of the invention in considerable detail for purposes of illustration, it will be understood by those skilled in the art that many of these details may be varied without departing from the spirit and scope of the invention.

I claim:

1. An abrasion-resistant optical element comprising a transparent and relatively rigid polymeric substrate having a pair of smooth optical surfaces; and a transparent coating of a relatively soft polymeric material bonded to at least one of said surfaces; said optical element having a light transmission value of at least 70 percent when tested in accordance with ASTM Standard D1003 and having a haze value no greater than 5 percent when tested in accordance with ASTM Standard D1003; said polymeric coating material having a durometer value within the range of 10 Shore A to 95 Shore D and a flexural modulus less than $0.2 \times 10^5$ psi as measured by ASTM Standard D790; said coating, when tested in accordance with ASTM Standards D673 and D1003 at a thickness of about ½ mil on a flat transparent test sample of poly(diethylene glycol bis allyl carbonate) and subjected to 2 kilograms of abrasive grit, producing a loss of light transmission no greater than 2.3 percent and an increase in haze no greater than 8.1 percent.

2. The optical element of claim 1 in which said relatively rigid polymeric substrate has a durometer value above substantially 95 Shore D and a flexural modulus of no less than $0.2 \times 10^5$ psi as measured by ASTM Standard D790.

3. The optical element of claim 2 in which said substrate is formed of a material selected from the group consisting of polycarbonates, polyacrylics, cellulose acetate, polystyrene, polysulfones, cellulose acetate butyrate, polyester, poly(4-methyl pentene-1), and selected polymers and copolymers thereof.

4. The optical element of claim 1 in which said coating has a thickness within the range of 0.1 to 20.0 mils.

5. The optical element of claim 4 in which said coating has a thickness within the range of 0.2 to 5 mils.

6. The optical element of claim 5 in which said coating has a thickness of about 1 mil.

7. The optical element of claim 1 in which said coating material is selected from the group consisting of polyurethane, polybutadiene, silicone, polysulfide, epoxy, polyacrylic, and selected copolymers thereof.

8. The optical element of claim 7 in which said coating material is a polyurethane reaction product of an aliphatic diisocyanate and aliphatic polyols.

9. The optical element of claim 8 in which said diisocyanate is a cycloaliphatic diisocyanate.

10. The optical element of claim 9 in which said polyols comprises a mixture of diol and polyol with more than two hydroxyl groups.

11. An abrasion-resistant optical element comprising a transparent and relatively rigid polymeric substrate having a pair of smooth optical surfaces; and a transparent coating of relatively soft polymeric material bonded to at least one of said surfaces; said optical element having a light transmission value of at least 70 percent when tested in accordance with ASTM Standard D1003 and having a haze value no greater than 5 percent when tested in accordance with ASTM Standard D1003; said polymeric coating material having a durometer value within the range 10 Shore A to 95 Shore D and a flexural modulus of less than $0.2 \times 10^5$ psi as measured by ASTM Standard D790; said coating, when tested in accordance with ASTM Standard D673 at a thickness of about ½ mil on a flat transparent test sample of poly(diethylene glycol bis allyl carbonate) and subjected to 2 kilograms of abrasive grit, producing a loss of light transmission no greater than 2.3 percent and an increase in haze no greater than 8.1 percent; said coating, when further tested in accordance with ASTM F32 at a thickness of about ½ mil on a flat transparent test sample of poly(diethylene glycol bis allyl carbonate), producing no permanent score visible to the naked eye following engagement by a moving stylus at a loading of up to 20 grams.

12. The optical element of claim 11 in which said relatively rigid polymeric substrate has a durometer value above substantially 95 Shore D and a flexural modulus no less than $0.2 \times 10^5$ psi as measured by ASTM Standard D790.

13. The optical element of claim 12 in which said substrate is formed of a material selected from the group consisting of polycarbonates, polyacrylics, cellulose acetate, polystyrene, polysulfones, cellulose acetate butyrate, polyester, poly(4-methyl pentene-1), and selected copolymers thereof.

14. The optical element of claim 11 in which said coating has a thickness within the range of 0.1 to 20.0 mils.

15. The optical element of claim 14 in which said coating has a thickness within the range of 0.2 to 5 mils.

16. The optical element of claim 15 in which said coating has a thickness of about 1 mil.

17. The optical element of claim 11 in which said coating material is selected from the group consisting of polyurethane, polybutadiene, silicone, polysulfide, epoxy, polyacrylic, and selected copolymers thereof.

18. The optical element of claim 17 in which said coating material is a polyurethane reaction product of an aliphatic diisocyanate and aliphatic polyols.

19. The optical element of claim 18 in which said diisocyanate is a cycloaliphatic diisocyanate.

20. The optical element of claim 19 in which said polyols comprises a mixture of diol and polyol having more than two hydroxyl groups.

* * * * *